United States Patent
Yokoyama et al.

(10) Patent No.: US 8,966,303 B2
(45) Date of Patent: Feb. 24, 2015

(54) INFORMATION PROCESSING APPARATUS AND METHOD FOR SAVING ENERGY IN AN IMAGE PROCESSING APPARATUS

(75) Inventors: Atsushi Yokoyama, Kanagawa (JP); Tomohiro Shuta, Kanagawa (JP); Tetsuyoshi Nakata, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 441 days.

(21) Appl. No.: 13/067,241

(22) Filed: May 18, 2011

(65) Prior Publication Data
US 2011/0302401 A1    Dec. 8, 2011

(30) Foreign Application Priority Data
Jun. 4, 2010 (JP) .................. 2010-129175

(51) Int. Cl.
 G06F 1/32 (2006.01)
 H04L 12/10 (2006.01)
(52) U.S. Cl.
 CPC .............. H04L 12/10 (2013.01); G06F 1/3206 (2013.01); G06F 1/3209 (2013.01)
 USPC ............................ 713/323; 713/321; 713/324
(58) Field of Classification Search
 CPC ...... G06F 1/3206; G06F 1/3209; H04L 12/10
 USPC ................................................. 713/321–324
 See application file for complete search history.

(56) References Cited

U.S. PATENT DOCUMENTS

| | | | |
|---|---|---|---|
| 6,816,976 B2 * | 11/2004 | Wright et al. | 713/323 |
| 7,424,632 B2 * | 9/2008 | Powers et al. | 713/323 |
| 7,516,335 B2 | 4/2009 | Watanabe | |
| 7,783,707 B2 | 8/2010 | Yokoyama | |
| 7,849,341 B2 * | 12/2010 | Sugiyama | 713/323 |
| 2005/0004991 A1 | 1/2005 | Yokoyama | |
| 2006/0192804 A1 | 8/2006 | Nakata et al. | |

(Continued)

FOREIGN PATENT DOCUMENTS

| | | |
|---|---|---|
| JP | 2005269103 A | 9/2005 |
| JP | 2009049698 A | 3/2009 |

(Continued)

OTHER PUBLICATIONS

Japanese Office Action dated Apr. 1, 2014 in corresponding Application No. 2010-129175.

*Primary Examiner* — Thuan Du
(74) *Attorney, Agent, or Firm* — Harness, Dickey & Pierce, P.L.C.

(57) ABSTRACT

An information processing apparatus includes a receiver configured to receive a packet via a communication line, an operating processor configured to suspend an operation thereof when the information processing apparatus is in an energy saving mode, a first storage configured to store the packet received by the receiver, a determining unit including a table in which different operations of the operating processor are recorded in association with different patterns of packets and configured to determine whether to restart the operating processor when the information processing apparatus is in the energy saving mode based on a pattern of the packet stored in the first storage and the patterns of the packets in association with the operations of the operating processor recorded in the table, and a power manager configured to supply power to the operating processor based on a result determined by the determining unit to restart the operating processor.

15 Claims, 10 Drawing Sheets

(56) References Cited

U.S. PATENT DOCUMENTS

| | | |
|---|---|---|
| 2008/0120394 A1 | 5/2008 | Yokoyama et al. |
| 2008/0155085 A1 | 6/2008 | Yokoyama et al. |
| 2009/0028586 A1 | 1/2009 | Yamashiro et al. |
| 2009/0119522 A1 | 5/2009 | Satoh |
| 2009/0125739 A1* | 5/2009 | Satoh ............................ 713/322 |
| 2009/0237744 A1 | 9/2009 | Ogura et al. |
| 2011/0057971 A1 | 3/2011 | Yokoyama et al. |

FOREIGN PATENT DOCUMENTS

| | | |
|---|---|---|
| JP | 2009049699 A | 3/2009 |
| JP | 2009134696 A | 6/2009 |

* cited by examiner

FIG.5

| DESTINATION MAC ADDRESS | MATCHING PATTERN | PATTERN MATCHED OPERATION |
|---|---|---|
| (1),(2),(3),(4) | ETHER TYPE: 0X0000~0X05DC | WAKEUP |
| (1),(2),(3) | ETHER TYPE: 0X0800 | WAKEUP |
| (1),(4) | ETHER TYPE: 0X0806 | WAKEUP |
| (1),(2),(3) | IPv4 & PORT NUMBER 161 | SLEEP |
| (1),(4) | IPv6 AND PORT NUMBER 161 | SLEEP |

FIG.6

| No | DESTINATION MAC ADDRESS PATTERN TABLE | REMARKS |
|---|---|---|
| (1) | OWN MAC ADDRESS | |
| (2) | FF:FF:FF:FF:FF:FF | |
| (3) | 01:00:5E:XX:XX:XX | IPv4 MULTICAST ADDRESS |
| (4) | 33:33:XX:XX:XX:XX | IPv6 MULTICAST ADDRESS |
| (5) | NO SETTING | BACKUP |

INFORMATION PROCESSING APPARATUS AND METHOD FOR SAVING ENERGY IN AN IMAGE PROCESSING APPARATUS

BACKGROUND OF THE INVENTION

1. Field of the Invention

The invention relates to an information processing apparatus that includes a receiver configured to receive a packet from a communication line and a processor configured to deactivate its operation in an energy saving mode, and an information processing method for use in the information processing apparatus, and a recording medium having an information processing program stored therein to execute the information processing method in the information processing apparatus.

2. Description of the Related Art

There is a system known in the art in which plural terminal devices are connected to an image processing apparatus such as a printer via a network. In such a system, an image processing apparatus is generally shared by the plural terminal devices, and hence signals are frequently transmitted via the communication line to the image processing apparatus shared by these terminal devices.

In the system having above configuration, if a central processing unit (CPU) of the image processing apparatus receives signals (packet) unnecessary to be processed by the CPU in an energy saving mode, where the CPU of the image processing apparatus is suspending its operation, the CPU is reactivated on receiving the packet. Thus, electric power may be unnecessarily consumed for the unnecessary operation of the CPU.

To prevent such unnecessary electric power consumption, there is proposed a method for controlling a packet to be processed by a CPU to be stored in a memory. In this control method, when an apparatus receives a packet necessary to be processed by the CPU in the energy saving mode, the received packet is temporarily stored in a buffer until the CPU wakes up or resumes its operation, and the stored packet is, after the CPU has awakened or resumed its operation, then stored in the memory.

Japanese Patent Application Publication No. 2009-49699 (hereinafter called "Patent Document 1") discloses an example of such a control method. The control method disclosed in Patent Document 1 includes determining whether a packet is processable, and updating first and second filters that determine whether to store the packet based on a determined result as to whether the packet is processable. Japanese Patent Application Publication No. 2005-269103 (hereinafter called "Patent Document 2") discloses another example of the control method. In the control method disclosed in Patent Document 2, a main controller (CPU) of a system controls ON/OFF operation of a function of a network controller in cooperation with the electric power status of the system.

However, with the above examples of the control method, the apparatus in the system needs to have a buffer having a large capacity to temporarily store subsequent portions of the packet completely. However, if the large capacity buffer to temporarily store the packet is provided in the apparatus in the system, the gate array size of the Application Specific Integrated Circuit (ASIC) to control the packets also needs to be increased, which may result in high electric power consumption.

SUMMARY OF THE INVENTION

It is a general object of at least one embodiment of the present invention to provide an information processing apparatus, an information processing method and a recording medium embodying a computer program to implement the information processing method in the information processing apparatus that are capable of reducing electric power consumption in an energy saving mode and substantially eliminate one or more problems caused by the limitations and disadvantages of the related art.

In one embodiment, there is provided an information processing apparatus that includes a receiver configured to receive a packet via a communication line; an operating processor configured to suspend an operation thereof when the information processing apparatus is in an energy saving mode; a first storage configured to store the packet received by the receiver; a determining unit including a table in which different operations of the operating processor are recorded in association with different patterns of packets and configured to determine whether to restart the operating processor when the information processing apparatus is in the energy saving mode based on a pattern of the packet stored in the first storage and the patterns of the packets in association with the operations of the operating processor recorded in the table; and a power manager configured to supply power to the operating processor based on a result determined by the determining unit to restart the operating processor.

In another embodiment, there is provided a method for processing information in an information processing apparatus, which includes a receiver to receive a packet via a communication line, an operating processor to suspend an operation thereof when the information processing apparatus is in an energy saving mode, a first storage to store the packet received by the receiver, a determining unit including a table in which different operations of the operating processor are recorded in association with different patterns of packets, and a power manager to supply power to the operating processor. The method includes determining whether to restart the operating processor when the information processing apparatus is in the energy saving mode based on a pattern of the packet stored in the first storage and the patterns of the packets in association with the operations of the operating processor recorded in the table; and supplying power to the operating processor based on a result determined in the determining step to restart the operating processor.

In another embodiment, there is provided a computer-readable, non-transitory recording medium having an information processing program stored therein for use in an information processing apparatus, which includes a receiver to receive a packet via a communication line, an operating processor to suspend an operation thereof when the information processing apparatus is in an energy saving mode, a first storage to store the packet received by the receiver, a determining unit including a table in which different operations of the operating processor are recorded in association with different patterns of packets, and a power manager to supply power to the operating processor. The information processing program causes, when processed by a processor, the information processing apparatus to execute a method for processing information that includes determining whether to restart the operating processor based on a pattern of the packet stored in the first storage and the patterns of the packets in association with the operations of the operating processor recorded in the table; and supplying power to the operating processor based on a result determined in the determining step to restart the operating processor.

BRIEF DESCRIPTION OF THE DRAWINGS

Other objects and further features of embodiments will be apparent from the following detailed description when read in conjunction with the accompanying drawings, in which:

FIG. 5 is a first diagram illustrating predetermined patterns set in a filter;

FIG. 6 is a second diagram illustrating MAC address patterns set in the filter;

DESCRIPTION OF THE PREFERRED EMBODIMENTS

With the embodiments described below, electric power consumption of an apparatus in an energy saving mode may be decreased by reducing the size of a buffer that temporarily stores a packet while securing its network function.

Embodiments

In the following, embodiments will be described with reference to accompanying drawings. The embodiments may be applied to a network adaptable apparatus that performs communications through the network. The embodiments described below are examples of the network adaptable apparatus that is embodied as an image forming apparatus.

Figure 1:
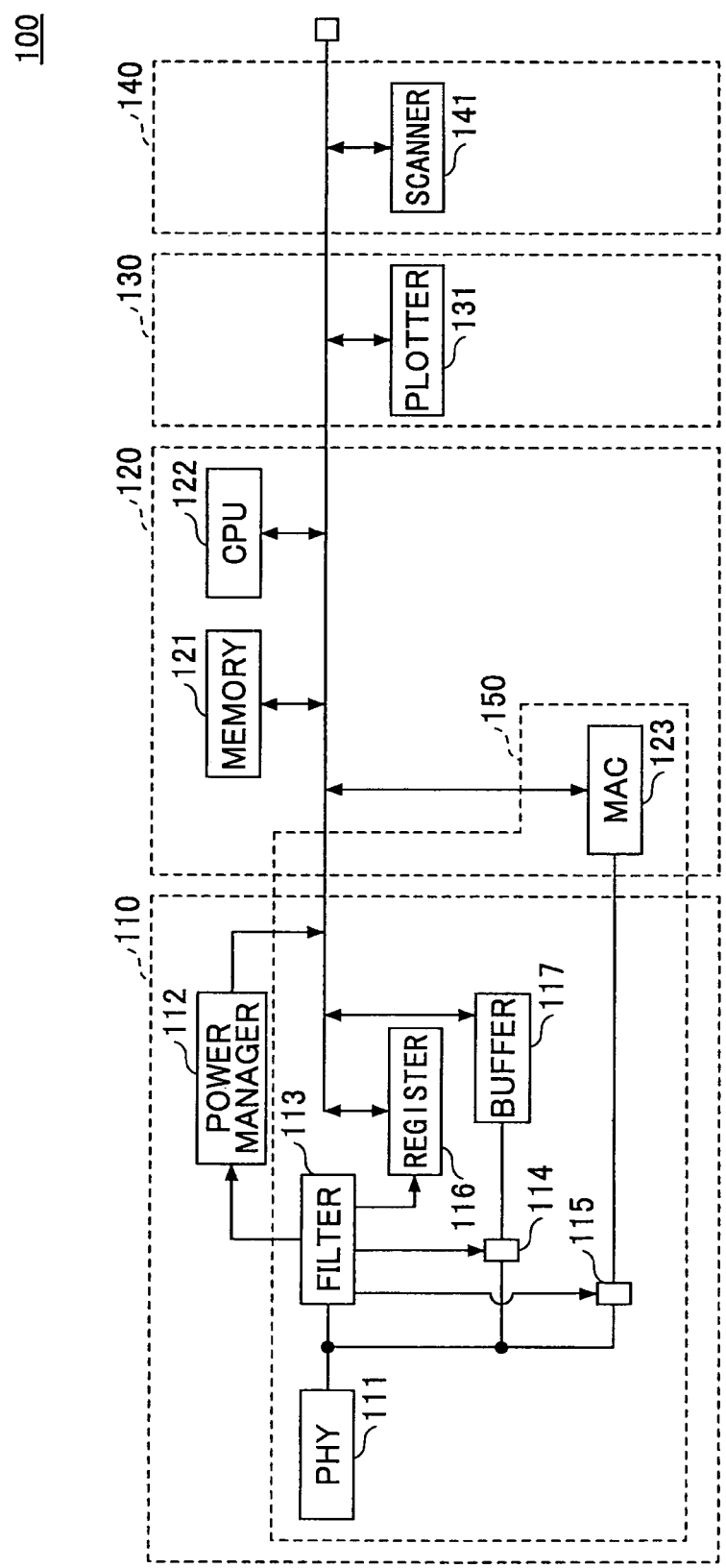
FIG. 1 is a diagram illustrating an image forming apparatus according to an embodiment.

FIG. 1 is a diagram illustrating an image forming apparatus 100 according to an embodiment.

The image forming apparatus 100 according to the embodiment is connected to the network to communicate with other network adaptable apparatuses via the network. In the image forming apparatus 100 according to the embodiment, plural components are grouped in blocks to manage the power in the blocks of the components.

The image forming apparatus 100 includes blocks 110, 120, 130 and 140. The block 110 includes a physical layer (PHY) 111, a power manager 112, a filter 113, gates 114 and 115, a register 116 and a buffer 117. The block 110 is configured to control power to be supplied to blocks 120, 130 and 140. The block 120 includes a memory 121, a CPU 122 and a media access control layer (MAC). The block 130 includes a plotter 131, and the block 140 includes a scanner 141.

The PHY 111 is configured to interconvert data and electric signals. The data herein indicates data received via a communication line such as the network or data to be transmitted via the communication line. The power manager 112 in the block 110 is configured to control the power supplied to the blocks 120, 130 and 140. The filter 113 in the block 110 is configured to determine whether to supply the power to the blocks 120, 130 and 140, or configured to control data flow.

Specifically, the filter 113 is configured to carry out packet pattern matching and supply, if a packet pattern matches a specific condition, power to the block 120 to wake up or resume its operation. Further, the filter 113 is configured to operate the gates 114 and 115 to manage data flow. Moreover, the filter 113 is configured to write in the register 116 a size of the packet that serves as a trigger to resume operations of or wake up the block 120. Note that to resume operations of or wake up the block 120 indicates to restart the CPU 122. Details of the filter 113 are described later.

Further, the gates 114 and 115 are switching units provided for blocking off data flow, which are controlled by the filter 113. In the image forming apparatus 100 according to the embodiment, the data flows through the gates 114 and 115 when the gates 114 and 115 are open while the data flow is blocked off by the gates 114 and 115 when the gates 114 and 115 are closed.

The gate 114 is located between the PHY 111 and the buffer 117 and is configured to control connection or disconnection of the PHY 111 and the buffer 117. The gate 115 is located between the PHY 111 and the MAC 123 and is configured to control connection or disconnection of the PHY 111 and the MAC 123. More specifically, the gate 115 is configured to control connection or disconnection of the PHY 111 and the CPU 122.

In the image forming apparatus 100 according to the embodiment, in a case where power is supplied merely to the block 110 (i.e., in an energy saving mode), only the gate 114 is open to save the received packet in the buffer 117. Further, in a case where power is supplied to the blocks 120, 130 and 140 in addition to the block 110 (i.e., in a normal mode), only the gate 115 is open to allow the received packet to be read by the CPU 122 via the MAC 123.

The register 116 is a storage configured to record a value indicating the size of the packet that has a triggered the block 120 to wake up or resume its operation. The register 116 is accessible by the CPU 122 for reading and writing contents of the register 116.

The buffer 117 is a storage configured to store a packet received by the PHY 111. In the image forming apparatus 100 according to the embodiment, the buffer 117 may not be configured to have a size to sufficiently store the entire received packet, but may be configured to have a size to store a part of the received packet. The size to store the entire received packet may be, for example, 1518 octets. The size to store the part of the received packet may be, for example, 256 octets. In the image forming apparatus 100 according to the embodiment, the size of the buffer 117 is 256 octets as an example. In the image forming apparatus 100 according to the embodiment, when the gate 114 is open, the packet received via the PHY 111 is written in the buffer 117. In this embodiment, a packet is stored in the buffer 117 from a header portion to a tail portion. If a free space (capacity) of the buffer 117 runs out before the buffer 117 stores the entire packet received via the PHY 111, the data associated with parts of the packet unreceived by the buffer 117 are discarded. Further, if the buffer 117 having no free space receives a packet, the packet stored in the buffer 117 is overwritten with a newly received packet.

The memory 121 is configured to store programs for executing functions of the image forming apparatus 100. The CPU 122 controls overall functions of the image forming apparatus 100. The MAC 123 is configured to control packet transmission or reception or to detect errors. The plotter 131 is a device configured to print out image data. The scanner 141 is a device configured to read a document to generate image data of the document.

Moreover, in the image forming apparatus 100 according to the embodiment, a communication function part 150 is composed of the components of the block 110 and the MAC 123. In this embodiment, the communication function part 150 is configured to control communications between the image forming apparatus 100 and other apparatuses connected to the image forming apparatus 100 via the network based on the data transmitted to the image forming apparatus 100. Further, the communication function part 150 is configured to determine whether to wake up the image forming apparatus from the energy saving mode or to resume the normal mode based on the data transmitted to the image forming apparatus 100. If the communication function part 150 determines to wake up the image forming apparatus 100 to or resume the normal mode, power is supplied to the block 120 to restart the CPU 122, so that the image forming apparatus 100 resumes operations or is woken up to the normal mode.

Note that the "energy saving mode" in the image forming apparatus 100 according to the embodiment indicates a situation where power is not supplied to the block 120, 130 or 140 and only the block 110 is in operation. In addition, the "normal mode" indicates a situation where at least the blocks 110 and 120 are in operation. In the image forming apparatus 100 according to the embodiment, the CPU 122 suspends its operation in the energy saving mode and restarts its operation based on a restarting instruction received from the communication function part 150.

Figure 2:
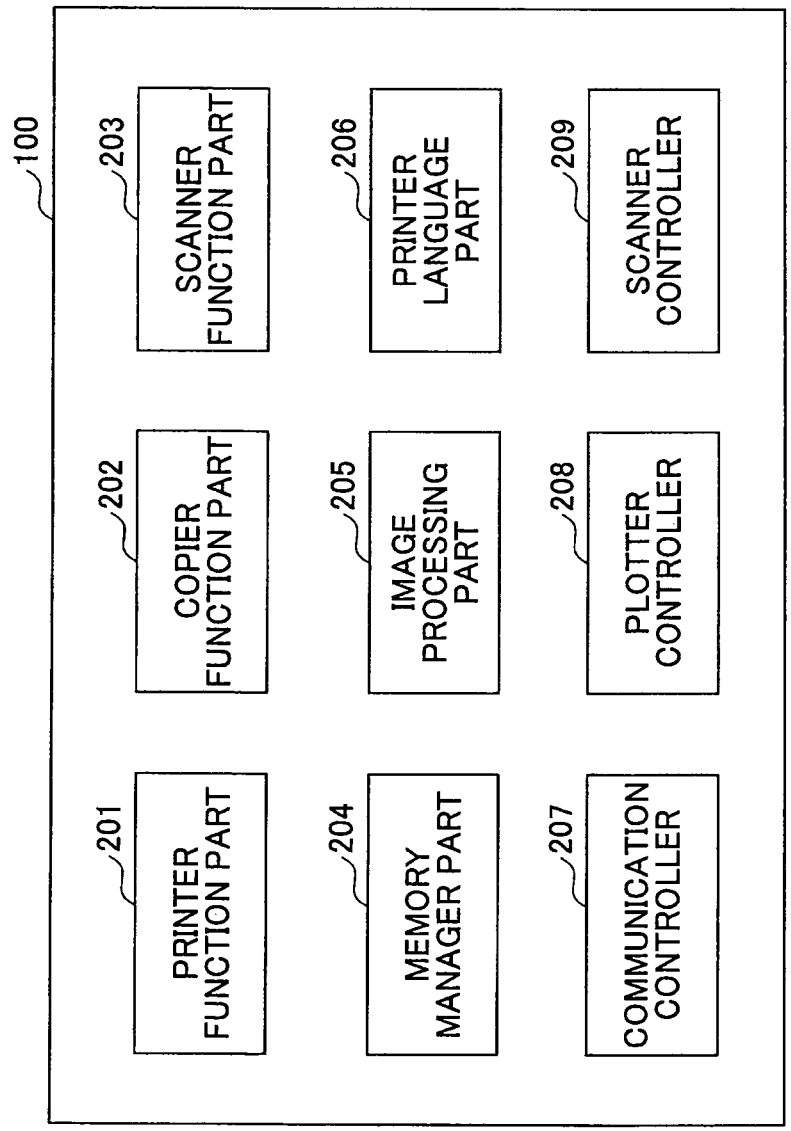
FIG. 2 is a diagram illustrating functions of the image forming apparatus according to the embodiment.

Next, functions of the image forming apparatus 100 according to the embodiment are described with reference to FIG. 2. FIG. 2 is a diagram illustrating the functions of the image forming apparatus 100 according to the embodiment.

The image forming apparatus 100 according to the embodiment includes a printer function part 201, a copier function part 202, a scanner function part 203, a memory manager part 204, an image processing part 205, a printer language part 206, a communication controller 207, a plotter controller 208 and a scanner controller 209.

The printer function part 201 is configured to control printer function-related operations. The copier function part 202 is configured to control copier function-related operations. The scanner function part 203 is configured to control scanner function-related operations. The memory manager part 204 is configured to manage the memory 121. The image processing part 205 is configured to perform image processes necessary for the corresponding functions. The image processing part 205 is further configured to carry out conversion of data into a tagged image file format (TIFF) or a joint photographic experts group (JPEG) format.

The printer language part 206 is configured to analyze printer job data received from the communication controller 207 and convert the data into images. The communication controller 207 is configured to control the communication function part 150. Details of the communication controller 207 are described later. The plotter controller 208 is configured to control the plotter 131. The scanner controller 209 is configured to control the scanner 141.

In this embodiment, after the CPU 122 restarts its operation to resume operations of or wake up the block 120, the communication function part 150 is controlled by the communication controller 207 to carry out the communications. The communication controller 207 is described in more detail below.

Figure 3:
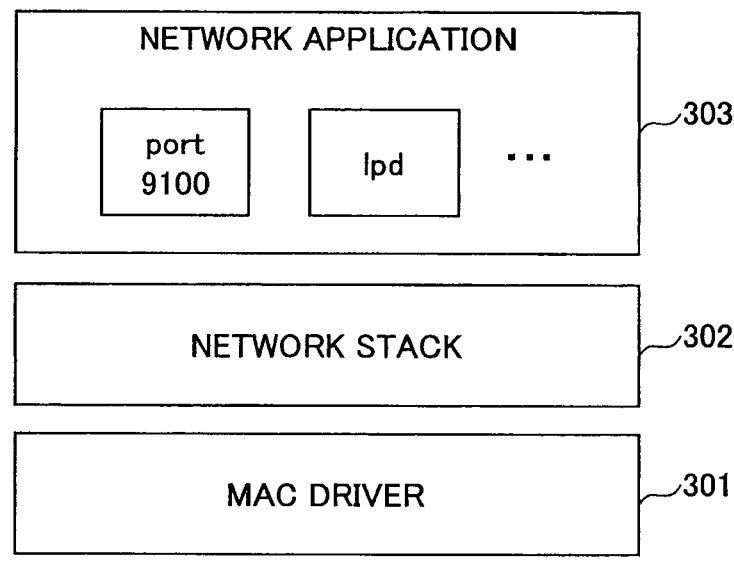
FIG. 3 is a diagram illustrating a detailed configuration of a communication controller.

FIG. 3 is a diagram illustrating a detailed configuration of the communication controller 207. The communication controller 207 includes a MAC driver 301, a network stack 302 and a network application 303.

The MAC driver 301 is configured to control the communication function part 150. The network stack 302 is configured to control an IP layer and a transport layer. The network application 303 is configured to control the network for each of the functions. In this embodiment, the network application 303 includes plural applications. Specifically, the applications include port 9100 and lpd protocols. The port 9100 protocol indicates an application to receive printing data from a computer connected to the image forming apparatus 100 and transmit the received printing data to a printer application. The lpd protocol indicates an application to receive printing data in compliance with a procedure specified in RFC 1179 from a computer connected to the image forming apparatus 100 and transmit the received printing data to the printer application.

Figure 4:
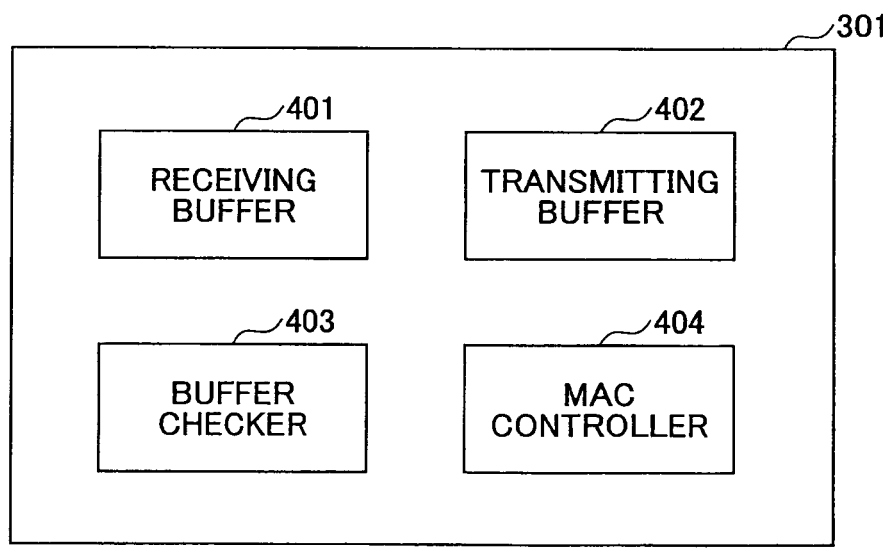
FIG. 4 is a detailed configuration of a MAC driver.

Next, details of the MAC driver 301 are described with reference to FIG. 4. FIG. 4 is a detailed configuration of the MAC driver 301.

In this embodiment, the MAC driver 301 includes a receiving buffer 401, a transmitting buffer 402, a buffer checker 403 and a MAC controller 404.

The receiving buffer 401 is configured to store data received from the MAC 123. The transmitting buffer 402 is configured to store data received from the network stack 302. The buffer checker 403 is configured to check whether the data are stored in the buffer 117. The MAC controller 404 is configured to control the MAC 123. In this embodiment, the MAC controller 404 stores the data received from the MAC 123 in the receiving buffer 401 and transmits the stored data to the network stack 302. Further, the MAC controller 404 transmits data that the network stack 302 has stored in the transmitting buffer 402 to the MAC 123.

Next, operations of the block 110 when the image forming apparatus 100 is in the energy saving mode are described.

When the image forming apparatus 100 according to the embodiment in the energy saving mode receives a packet, the filter 113 determines whether to resume operations of or wake up the block 120 based on the packet received by the filter 113.

Next, the filter 113 is described below. In the image forming apparatus 100 according to the embodiment, the filter 113 contains predetermined patterns based on which the block 120 resumes operations or is woken up. The filter 113 determines whether a received packet matches one of the predetermined patterns set in the filter 113 to resume operations of or wake up the block 120. When the received packet matches the predetermined pattern set in the filter 113, the filter 113 controls the gates 114 and 115 to resume operations of or wake up the block 110.

Next, the predetermined patterns set in the filter 113 in this embodiment are described with reference to FIGS. 5 and 6.

FIG. 5 is a first diagram illustrating predetermined patterns set in the filter 113 and FIG. 6 is a second diagram illustrating the predetermined patterns set in the filter 113.

FIG. 5 indicates a correspondence table 50 set in the filter 113. The correspondence table 50 includes a list of destination MAC addresses in association with corresponding matching patterns and operations for use when a destination MAC address of the received packet matches one of the destination MAC addresses in the list.

FIG. 6 illustrates an address pattern table 60 that includes destination MAC address patterns.

In this embodiment, if the received packet includes one of the destination MAC addresses (1), (2), (3) and (4) in the address pattern table 60 and a matching pattern indicating an Ether type of "0x000-0x5DC", the filter 113 determines to restart the CPU 122 to resume operations of or wake up the block 120.

Further, if the received packet includes one of the destination MAC addresses (1), (2) and (3) in the destination MAC address pattern table 60 and a matching pattern indicating IPv4 and a port number 161 in the correspondence table 50, the filter 113 determines not to restart the CPU 122 so that the block 120 remains in the energy saving mode.

Figure 7:
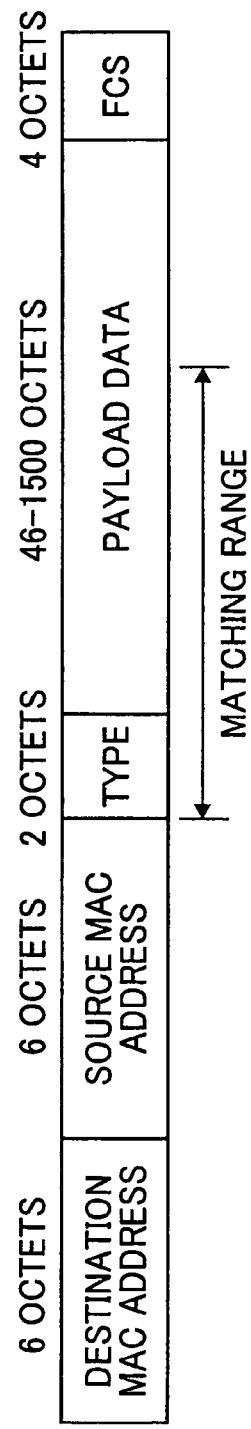
FIG. 7 is a diagram illustrating an example of a packet data structure.

In this embodiment, the data size utilized for determining whether the received packet matches any of the predetermined patterns set in the filter 113 may be a minimum necessary size. FIG. 7 is a diagram illustrating an example of a packet data structure.

The packet includes a destination MAC address, a source MAC address, a type, payload data and a frame check sequence (FCS). The destination. MAC address indicates a destination address to which the payload data are to be delivered. The source MAC address indicates the MAC address of its own apparatus from which the packet is transmitted and to which a unique number imprinted on the ROM of the own apparatus is normally allocated. The type is a protocol type that indicates a higher-layer protocol stored in a data field.

The payload data ranging from 46 to 1500 octets are stored as application data. The FCS is a bit array for detecting whether the payload data are damaged.

When the filter 113 determines to restart the CPU 122 based on a matching result of the received packet with the correspondence table 50 and the address pattern table 60, the filter 113 controls the power manager 112 and the gates 114 and 115 to resume operations of or wake up the block 120.

Figure 8:
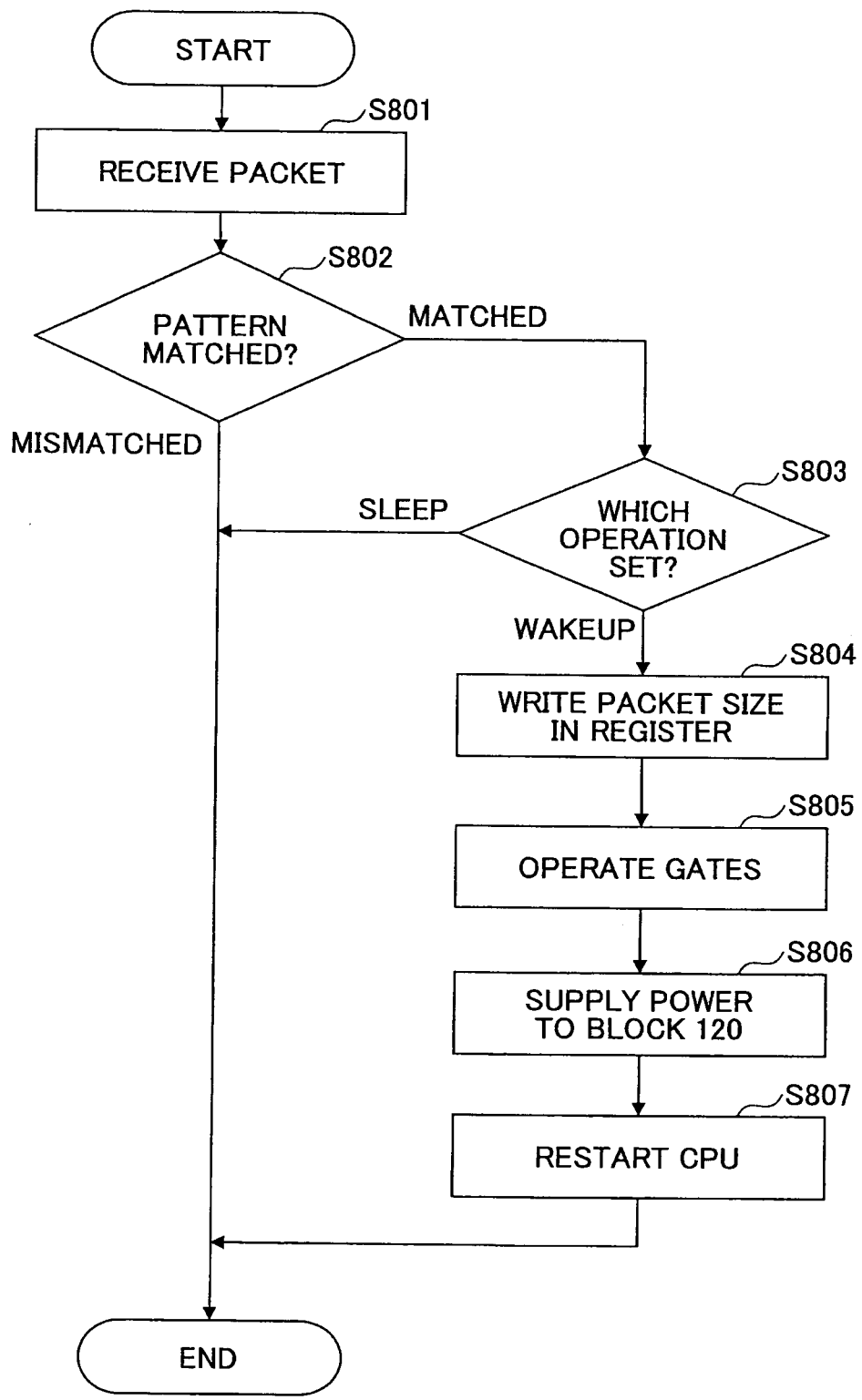
FIG. 8 is a flowchart illustrating an operation when a CPU resumes its operation from an energy saving mode.

Next, restarting of the CPU 122 in the image forming apparatus 100 according to the embodiment is described with reference to FIG. 8. FIG. 8 is a flowchart illustrating a process when the CPU 122 resumes operations or is woken up from the energy saving mode.

In the image forming apparatus 100 in the energy saving mode, when the filter 113 receives a packet (step S801), the filter 113 performs pattern matching on the received packet based on the correspondence table 50 and the address pattern table 60 (step S802).

In step S802, if the pattern of the received packet does not match any of the patterns set in the correspondence table 50, the filter 113 terminates the process. At this moment, the gate 114 is open and the gate 115 is closed.

Further, in step S802, if the pattern of the received packet matches any of the patterns set in the correspondence table 50, the filter 113 refers to a value of a pattern-matched operation, which indicates an operation to be conducted when the pattern of the received packet matches one of the patterns set in the correspondence table 50 (step S803). In step S803, if the value of the pattern-matched operation in the correspondence table 50 is "SLEEP", the filter 113 terminates the process while allowing the CPU 122 to remain in the energy saving mode without restarting the CPU 122. Note that in step S802, if the pattern of the received packet matches two or more patterns set in the correspondence table 50, the "SLEEP" operation becomes effective as the pattern-matched operation.

In step S803, if the value of the pattern-matched operation in the correspondence table 50 is "WAKEUP", the filter 113 stores the received packet in the buffer 117 and writes the size of the packet in the register 116 (step S804). Subsequently, the filter 113 carries out operations to close the gate 114 and open the gate 115 (step S805).

At this moment, the size of the packet stored in the buffer may not necessarily match the size of the packet written in the register 116. In this embodiment, the size of the buffer 117 is 256 octets Thus, if the size of the received packet is 1518 octets, the first 256 octets of 1518 octets are stored in the buffer 117; that is, the buffer 117 stores merely part of the received packet. By contrast, the value of 1518 octets is written as the size of the received packet in the register 116. Thus, in the above case, the size of the received packet written in the register 116 differs from the size of the received packet stored in the buffer 117. Note that if the size of the received packet is equal to 256 octets that is the size of the buffer 117, the entire received packet is stored in the buffer 117, and hence the size of the received packed stored in the buffer 117 matches the size of the received packet written in the register 116.

Subsequently, the filter 113 controls the power manager 112 to supply power to the block 120 (Step S806). Note that in this step, power may also be supplied to the blocks 130 and 140. Subsequently, the filter 113 restarts the CPU 122 (Step S807). When the CPU 122 is restarted, the image forming apparatus 100 is in the normal mode.

Figure 9:
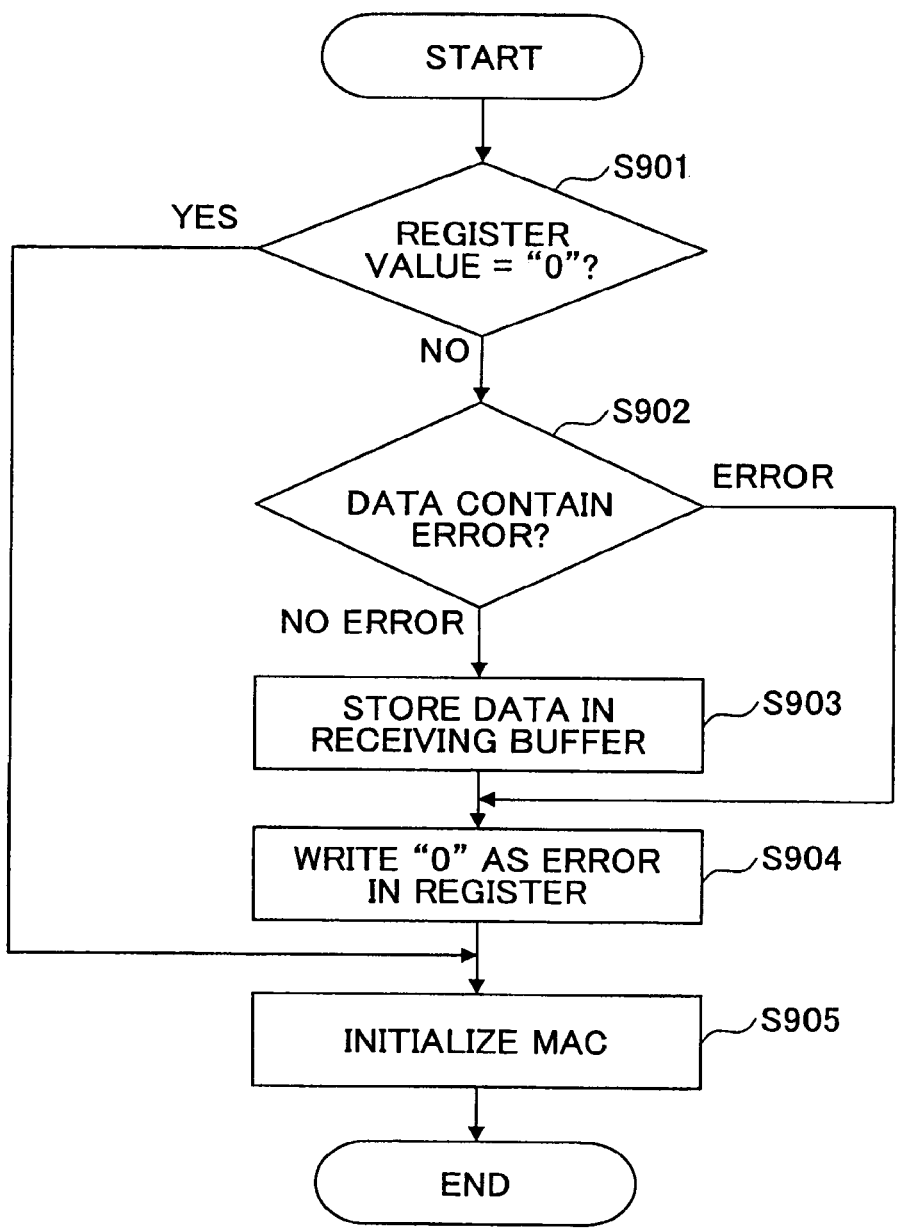
FIG. 9 is a diagram illustrating an operation of a MAC driver after the image forming apparatus has resumed a normal mode.

Next, operations of the image forming apparatus 100 in the normal mode are described. FIG. 9 is a diagram illustrating an operation of the MAC driver 301 after the image forming apparatus 100 resumes operations in the normal operation.

In this embodiment, when the CPU 122 is restarted and the image forming apparatus 100 transitions to the normal mode, the MAC driver 301 determines whether the register 116 has a value of "0" (step S901). In step S901, if the register 116 has the value of "0", the CPU 122 initializes the MAC 123 (step S905).

Note that the register 116 having the value of "0" indicates that the image forming apparatus 100 has not received a packet when it resumes operations in the normal mode. Thus, the image forming apparatus 100 resumes operations in the normal mode due to a trigger other than the size of the received packet. The trigger other than the size of the received packet, which allows the image forming apparatus 100 to resume operations in the normal mode, may be a user's operation or the like.

In step S901, if the register 116 does not have the value of 0, the image forming apparatus 100 checks whether the packet stored in the buffer 117 has been damaged; that is, whether the packet data in the buffer 117 contain an error (step S902). Details of the determination process in step S902 are described later. In step S902, if the packet has been damaged (contains an error), the value "0" is written as an error in the register 116 (step S904), and the process moves to step S905.

In step S902, if the packet has not been damaged, the packet stored in the buffer 117 is retrieved and the retrieved packet is then stored in the receiving buffer 401 of the MAC driver 301 (step S903). Information indicating that the packet has been stored in the receiving buffer 401 of the MAC driver 301 is reported to the network stack 302. The process then moves to step S904. When the value "0" is written in the register 116 in step S904, the MAC 123 is initialized in step S905.

Figure 10:
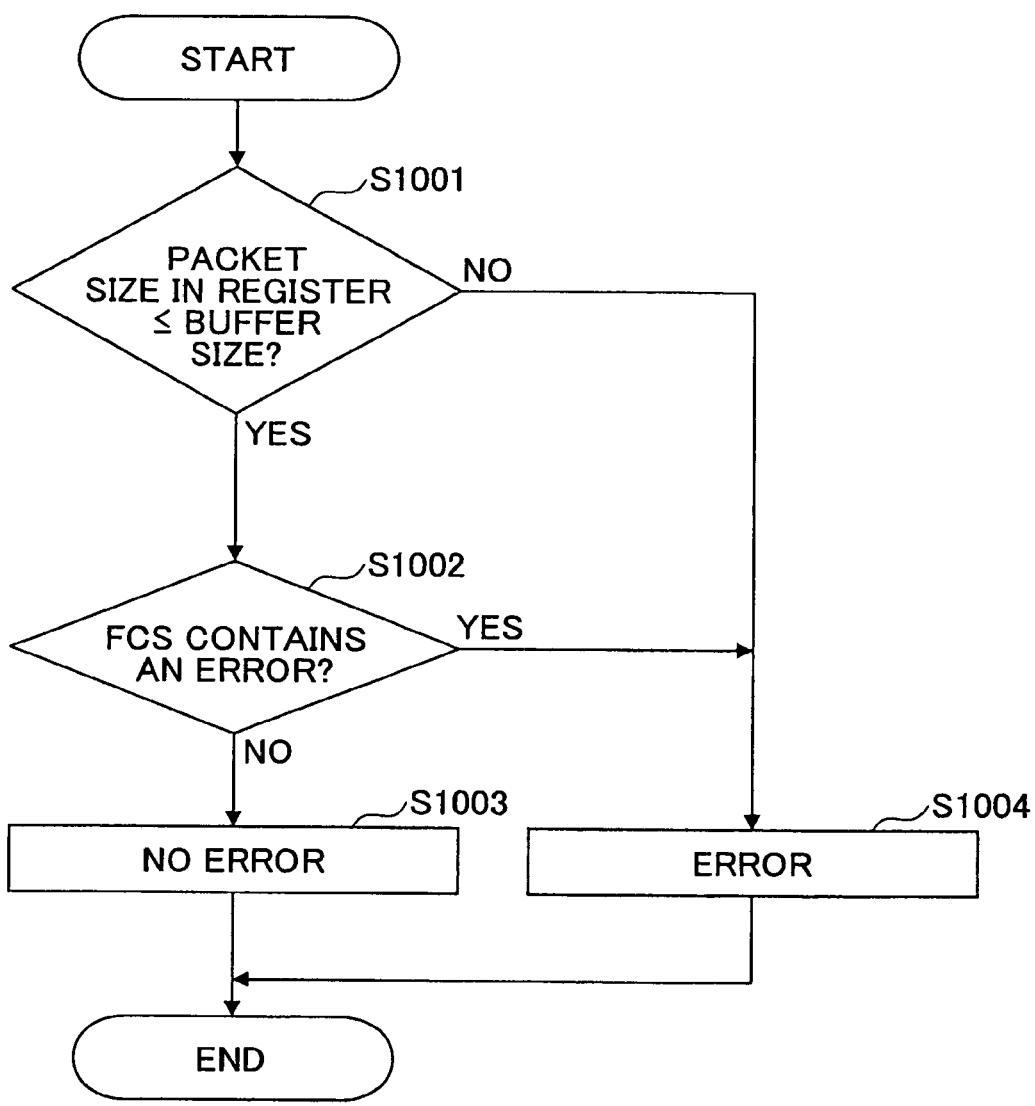
FIG. 10 is a first flowchart illustrating a detailed process of step S902 illustrated in FIG. 9.

A process in step S902 is further described below. FIG. 10 is a first flowchart illustrating a detailed process of step S902 illustrated in FIG. 9.

The CPU 122 compares the value indicating the size of the packet written in the register 116 and the actual size of the buffer 117, that is, the capacity of the buffer 117 (step S1001). If the value indicating the size of the received packet written in the register 116 is equal to or smaller than the size (capacity) of the buffer 117 ("YES" in step S1001), the entire received packet is stored in the buffer 117. The CPU 122 checks the FCS (frame check sequence) of the packet stored in the buffer 117 to determine whether the FCS contains an error (step S1002).

If the CPU 122 determines that the FCS contains no error (step S1003), the process moves to step S903 in FIG. 9.

If, on the other hand, the CPU 122 determines that the FCS contains an error (step S1004), the process moves to step S904 in FIG. 9. Further, if the value indicating the size of the received packet written in the register 116 is larger than the size (capacity) of the buffer 117 ("NO" in step S1001), the received packet is not entirely stored in the buffer 117, and an error is generated (step S1004).

Note that in this embodiment, when the packet is stored in the receiving buffer 401 in step S903 and the data stored in the buffer 117 is part of the packet having a specific data structure, the entire packet may be restored, based on the part of the packet in the buffer 117 and the packet that has been entirely restored based on the part of the packet in the buffer 117, in the receiving buffer 401.

Figure 11:
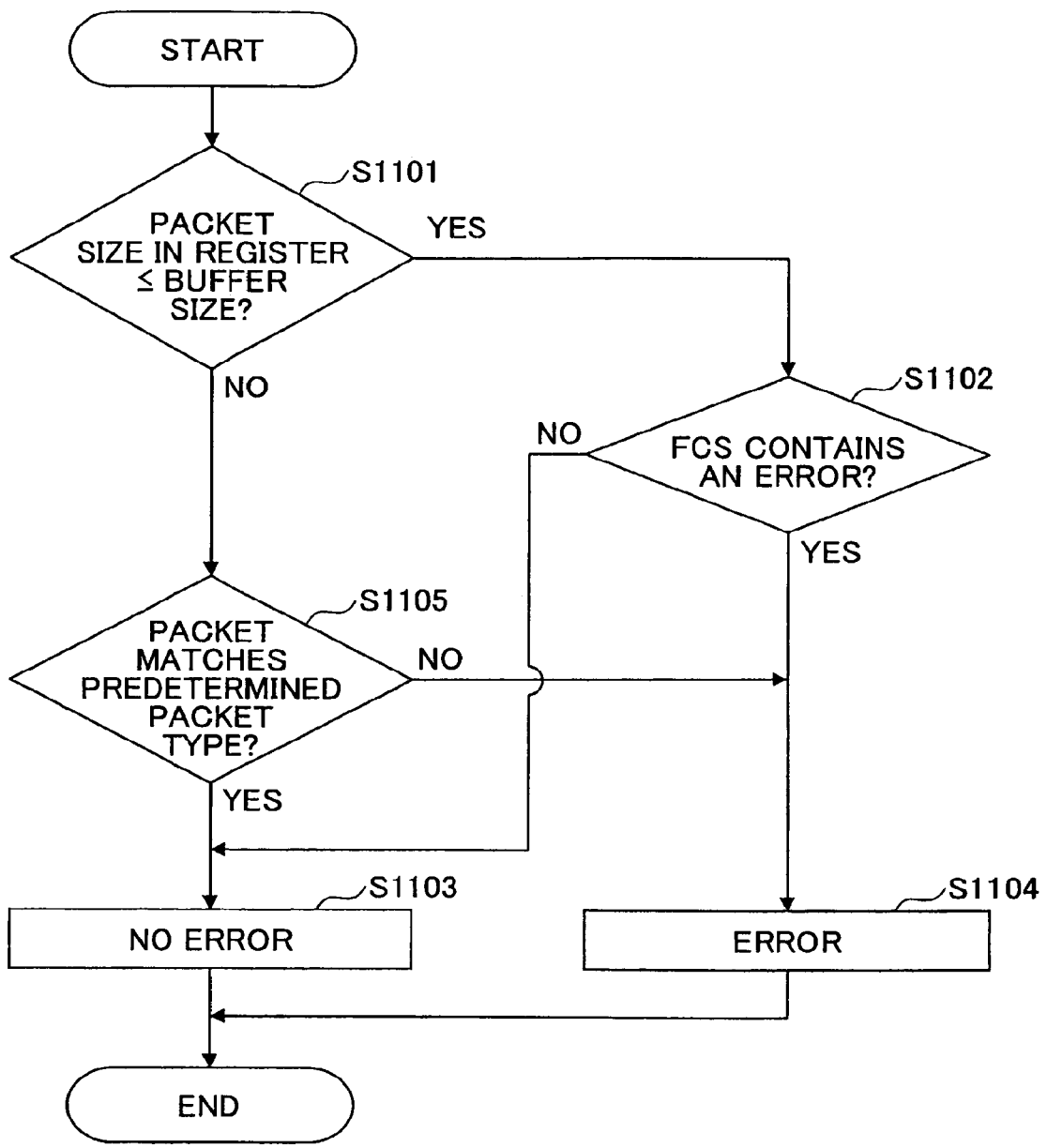
FIG. 11 is a second flowchart illustrating a detailed process of step S902 illustrated in FIG. 9.

FIG. 11 is a second flowchart illustrating a detailed process of step S902 illustrated in FIG. 9. The detailed process of step S902 where the entire packet is restored is described with reference to FIG. 11.

The CPU 122 compares the value indicating the size of the received packet written in the register 116 and the size of the buffer 117, that is, the capacity of the buffer 117 (step S1101). If the size of the received packet in the register 116 is equal to or smaller than the size of the buffer 117 (i.e., the capacity of the buffer 117) ("YES" in step S1101), the CPU 122 checks the FCS of the packet stored in the buffer 117 to determine whether the FCS contains an error (step S1102). Note that the processes in steps S1102 through S1104 in FIG. 11 are similar to those in steps S1002 through S1004 in FIG. 10, and the corresponding descriptions in FIG. 11 are thus omitted.

If the value indicating the size of the received packet recorded in the register 116 is larger than the size (capacity) of the buffer 117 ("NO" in step S1101), the CPU 122 determines whether the packet stored in the buffer 117 matches a predetermined type packet (step S1105). If the CPU 122 determines that the packet in the buffer 117 matches the predetermined type packet ("YES" in step S1105), the CPU 122 determines that the packet contains no error (step S1103). If, on the other hand, the CPU 122 determines that the packet in the buffer 117 does not match the predetermined type packet ("NO" in step S1105), the CPU 122 determines that the packet contains an error (step S1104).

Note that the predetermined type packet indicates a packet containing a specific data structure that may be regularly transmitted from an operating system (OS). With the predetermined type packet, a subsequent part of the packet may be estimated from a preceding part of the same packet. In this embodiment, the predetermined type packet is stored in advance in the memory 121 or the like. Accordingly, the CPU 122 may determine whether the packet in the buffer 117 matches the predetermined type packet by comparing the packet stored in the buffer 117 and the predetermined type packet stored in advance in the memory 121 or the like.

If the packet in the buffer 117 matches the predetermined type packet ("YES" in step S1105), the CPU 122 estimates the subsequent part of the packet based on the preceding part of the same packet to restore the entire packet when the packet is stored in the receiving buffer 401 in step S902 illustrated in FIG. 9. In step S1105, if a part of the packet in the buffer 117 matches a part of the predetermined type packet, a remaining part of the predetermined type packet may be estimated as a missing part of the packet in the buffer 117.

As described above, in the image forming apparatus 100 according to the embodiment, the network function may be maintained while reducing the size of the buffer 117 that stores the received packet in the energy saving mode. Further, since it is possible to reduce the size of the buffer 117, the number of gates formed in the buffer 117 may be reduced. Accordingly, since the number of gates that form the block 110, which operates in the energy saving mode, may be decreased, electric power consumption in the energy saving mode may be reduced.

Note that in this embodiment, the CPU 122 is only provided in the block 120; however, the CPU 122 may not be limited to being only provided in the block 120. For example, an additional CPU for controlling the plotter 131 may be separately provided in the block 130, or another additional CPU for controlling the scanner 141 may be separately provided in the block 140.

According to the embodiments described above, the electric power consumption of the image forming apparatus 100 in the energy saving mode may be reduced.

According to one embodiment, there is provided an information processing apparatus that includes a receiver configured to receive a packet via a communication line; an operating processor configured to suspend an operation thereof when the information processing apparatus is in an energy saving mode; a first storage configured to store the packet received by the receiver; a determining unit including a table in which different operations of the operating processor are recorded in association with different patterns of packets and configured to determine whether to restart the operating processor when the information processing apparatus is in the energy saving mode based on a pattern of the packet stored in the first storage and the patterns of the packets in association with the operations of the operating processor recorded in the table; and a power manager configured to supply power to the operating processor based on a result determined by the determining unit to restart the operating processor.

The information processing apparatus further includes a first switching unit configured to control connection or disconnection between the receiver and the first storage, the first switching unit connecting the receiver to the first storage when the information processing apparatus is in the energy saving mode and disconnecting the receiver from the first storage when the determining unit determines to restart the operating processor; and a second switching unit configured to control connection or disconnection between the receiver and the operating processor, the second switching unit disconnecting the receiver from the operating processor when the information processing apparatus is in the energy saving mode and connecting the receiver to the operating unit when the determining unit determines to restart the operating processor.

The information processing apparatus further includes a second storage configured to record a value indicating a size of the packet received by the receiver. In the information processing apparatus, when the determining unit determines to restart the operating processor based on the size of the packet received by the receiver, the second storage records the value indicating the size of the packet received by the receiver based on which the determining unit has determined to restart the operating processor.

In the information processing apparatus, when the power manager supplies the power to the operating processor to restart the operating processor, the operating processor compares a size of the first storage and the value indicating the size of the packet recorded in the second storage, and when the size of the first storage is equal to or larger than the size of the packet recorded in the second storage, the operating processor retrieves the packet stored in the first storage.

In the information processing apparatus, when the size of the first storage is smaller than the size of the packet recorded in the second storage and a part of the packet stored in the first storage includes a predetermined pattern, the operating processor restores the packet stored in the first storage based on the part of the packet stored therein.

According to another embodiment, there is provided a method for processing information in an information processing apparatus, which includes a receiver to receive a packet via a communication line, an operating processor to suspend an operation thereof when the information processing apparatus is in an energy saving mode, a first storage to store the packet received by the receiver, a determining unit including a table in which different operations of the operating processor are recorded in association with different patterns of packets, and a power manager to supply power to the operating processor. The method includes determining whether to restart the operating processor when the information processing apparatus is in the energy saving mode based on a pattern of the packet stored in the first storage and the patterns of the packets in association with the operations of the operating processor recorded in the table; and supplying power to the operating processor based on a result determined in the determining step to restart the operating processor.

The method for processing information further includes connecting the receiver to the first storage while disconnecting the receiver from the operating processor when the information processing apparatus is in the energy saving mode; and disconnecting the receiver from the first storage while connecting the receiver to the operating unit when the determining unit determines to restart the operating processor.

The method for processing information further includes recording a value indicating a size of the packet received by the receiver in a second storage, when the determining unit determines to restart the operating processor based on the size of the packet received by the receiver.

The method for processing information further includes comparing a size of the first storage and the value indicating the size of the packet recorded in the second storage when the power is supplied to the operating processor to restart the operating processor; and retrieving, when the size of the first storage is equal to or larger than the size of the packet recorded in the second storage, the packet stored in the first storage.

The method for processing information further includes restoring, when the size of the first storage is smaller than the size of the packet recorded in the second storage and a part of the packet stored in the first storage includes a predetermined pattern, the packet stored in the first storage based on the part of the packet stored therein.

According to another embodiment, there is provided a computer-readable, non-transitory recording medium having an information processing program stored therein for use in an information processing apparatus, which includes a receiver to receive a packet via a communication line, an operating processor to suspend an operation thereof when the information processing apparatus is in an energy saving mode, a first storage to store the packet received by the receiver, a determining unit including a table in which different operations of the operating processor are recorded in association with different patterns of packets, and a power manager to supply power to the operating processor. The information processing program causes, when processed by a processor, the information processing apparatus to execute a method for processing information that includes determining whether to restart the operating processor based on a pattern of the packet stored in the first storage and the patterns of the packets in association with the operations of the operating processor recorded in the table; and supplying power to the operating processor based on a result determined in the determining step to restart the operating processor.

In the computer-readable recording medium, the method further includes connecting the receiver to the first storage while disconnecting the receiver from the operating processor when the information processing apparatus is in the energy saving mode; and disconnecting the receiver from the first storage while connecting the receiver to the operating unit when the determining unit determines to restart the operating processor.

In the computer-readable recording medium, the method further includes recording a value indicating a size of the packet received by the receiver in a second storage, when the determining unit determines to restart the operating processor based on the size of the packet received by the receiver.

In the computer-readable recording medium, the method further includes comparing a size of the first storage and the value indicating the size of the packet recorded in the second storage when the power is supplied to the operating processor to restart the operating processor; and retrieving, when the size of the first storage is equal to or larger than the size of the packet recorded in the second storage, the packet stored in the first storage.

In the computer-readable recording medium, the method further includes storing, when the size of the first storage is smaller than the size of the packet recorded in the second storage and a part of the packet stored in the first storage includes a predetermined pattern, the packet stored in the first storage based on the part of the packet stored therein.

Embodiments of the present invention have been described heretofore for the purpose of illustration; however, the present invention is not limited to these embodiments. Various variations and modifications may be made without departing from the scope of the present invention. The present invention should not be interpreted as being limited to the embodiments that are described in the specification and illustrated in the drawings.

The present application is based on Japanese Priority Application No. 2010-129175 filed on Jun. 4, 2010, with the Japanese Patent Office, the entire contents of which are hereby incorporated by reference.

What is claimed is:

1. An information processing apparatus comprising:
a receiver configured to receive a packet via a communication line;
an operating processor configured to suspend an operation thereof when the information processing apparatus is in an energy saving mode;
a first storage configured to store the packet received by the receiver;
a determining unit including a first table having address patterns of received packets in association with destination addresses, and a second table specifying operations of the operating processor when matching patterns match the destination addresses specified based on the first table, the determining unit being configured to determine whether to restart the operating processor from the energy saving mode based on the packets, and the first and second tables stored in the first storage unit; and
a power manager configured to supply power to the operating processor based on a result determined by the determining unit to restart the operating processor.

2. The information processing apparatus as claimed in claim 1, further comprising:
a second storage configured to record a value indicating a size of the packet received by the receiver, wherein
when the determining unit determines to restart the operating processor based on the size of the packet received by the receiver, the second storage records the value indicating the size of the packet received by the receiver based on which the determining unit has determined to restart the operating processor.

3. The information processing apparatus as claimed in claim 2, wherein
when the power manager supplies the power to the operating processor to restart the operating processor, the operating processor compares a size of the first storage and the value indicating the size of the packet recorded in the second storage, and wherein
when the size of the first storage is equal to or larger than the size of the packet recorded in the second storage, the operating processor retrieves the packet stored in the first storage.

4. The information processing apparatus as claimed in claim 2, wherein
when the size of the first storage is smaller than the size of the packet recorded in the second storage and a part of the packet stored in the first storage includes a predetermined pattern, the operating processor restores the packet stored in the first storage based on the part of the packet stored therein.

5. The information processing apparatus as claimed in claim 1, further comprising:
a first switching unit configured to control connection or disconnection between the receiver and the first storage, the first switching unit connecting the receiver to the first storage when the information processing apparatus is in the energy saving mode and disconnecting the receiver from the first storage when the determining unit determines to restart the operating processor; and
a second switching unit configured to control connection or disconnection between the receiver and the operating processor, the second switching unit disconnecting the receiver from the operating processor when the information processing apparatus is in the energy saving mode and connecting the receiver to the operating unit when the determining unit determines to restart the operating processor.

6. A method for processing information in an information processing apparatus, the information processing apparatus including a receiver to receive a packet via a communication line, an operating processor to suspend an operation thereof when the information processing apparatus is in an energy saving mode, a first storage to store the packet received by the receiver, a power manager to supply power to the operating processor, and a determining unit, the determining unit including a first table having address patterns of received packets in association with destination addresses and a second table specifying operations of the operating processor when matching patterns match the destination addresses specified based on the first table, the method comprising:
determining whether to restart the operating processor from the energy saving mode based on the packets, and the first and second tables stored in the first storage unit; and
supplying power to the operating processor based on a result determined in the determining step to restart the operating processor.

7. The method as claimed in claim 6, further comprising:
recording a value indicating a size of the packet received by the receiver in a second storage, when the determining unit determines to restart the operating processor based on the size of the packet received by the receiver.

8. The method as claimed in claim 7, further comprising:
comparing a size of the first storage and the value indicating the size of the packet recorded in the second storage when the power is supplied to the operating processor to restart the operating processor; and
retrieving, when the size of the first storage is equal to or larger than the size of the packet recorded in the second storage, the packet stored in the first storage.

9. The method as claimed in claim 7, further comprising:
restoring, when the size of the first storage is smaller than the size of the packet recorded in the second storage and a part of the packet stored in the first storage includes a predetermined pattern, the packet stored in the first storage based on the part of the packet stored therein.

10. The method as claimed in claim 6, further comprising:
connecting the receiver to the first storage while disconnecting the receiver from the operating processor when the information processing apparatus is in the energy saving mode; and
disconnecting the receiver from the first storage while connecting the receiver to the operating unit when the determining unit determines to restart the operating processor.

11. A computer-readable, non-transitory recording medium having an information processing program stored therein for use in an information processing apparatus, the information processing apparatus including a receiver to receive a packet via a communication line, an operating processor to suspend an operation thereof when the information processing apparatus is in an energy saving mode, a first storage to store the packet received by the receiver, a determining unit including a power manager to supply power to the operating processor, and a determining unit, the determining unit including a first table having address patterns of received packets in association with destination addresses and a second table specifying operations of the operating processor when matching patterns match the destination addresses specified based on the first table, the information processing program causing, when processed by a processor, the information processing apparatus to execute a method for processing information comprising:
determining whether to restart the operating processor from the energy saving mode based on the packets, and the first and second tables stored in the first storage unit; and
supplying power to the operating processor based on a result determined in the determining step to restart the operating processor.

12. The computer-readable recording medium as claimed in claim 11, the method further comprising:
recording a value indicating a size of the packet received by the receiver in a second storage, when the determining unit determines to restart the operating processor based on the size of the packet received by the receiver.

13. The computer-readable recording medium in claim 12, the method further comprising:
comparing a size of the first storage and the value indicating the size of the packet recorded in the second storage when the power is supplied to the operating processor to restart the operating processor; and
retrieving, when the size of the first storage is equal to or larger than the size of the packet recorded in the second storage, the packet stored in the first storage.

14. The computer-readable recording medium as claimed in claim 12, the method further comprising:
restoring, when the size of the first storage is smaller than the size of the packet recorded in the second storage and a part of the packet stored in the first storage includes a predetermined pattern, the packet stored in the first storage based on the part of the packet stored therein.

15. The computer-readable recording medium as claimed in claim 11, the method further comprising:
connecting the receiver to the first storage while disconnecting the receiver from the operating processor when the information processing apparatus is in the energy saving mode; and
disconnecting the receiver from the first storage while connecting the receiver to the operating unit when the determining unit determines to restart the operating processor.

* * * * *